United States Patent
Iimura et al.

(10) Patent No.: US 7,828,194 B2
(45) Date of Patent: Nov. 9, 2010

(54) METHOD FOR POSITIONING PLATE MEMBERS TO BE BUTT-WELDED

(75) Inventors: Kenji Iimura, Tokyo (JP); Tomoo Mizuno, Tokyo (JP); Katsura Oowaki, Tokyo (JP); Hirotaka Kanazawa, Tokyo (JP); Chikamasa Iwamoto, Toyota (JP); Toshikazu Yagi, Toyota (JP); Hirotaka Shirai, Toyota (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 12/717,414

(22) Filed: Mar. 4, 2010

(65) Prior Publication Data

US 2010/0187292 A1 Jul. 29, 2010

Related U.S. Application Data

(62) Division of application No. 11/916,541, filed as application No. PCT/JP2005/010319 on Jun. 6, 2005.

(51) Int. Cl.
*B23K 5/22* (2006.01)
*B23K 37/00* (2006.01)
*B23K 1/14* (2006.01)

(52) U.S. Cl. .................. 228/212; 228/44.3; 228/49.4
(58) Field of Classification Search ............. 228/49.3, 228/49.4, 44.3, 5.5, 212; 219/57, 101
See application file for complete search history.

(56) References Cited

U.S. PATENT DOCUMENTS

| | | | |
|---|---|---|---|
| 3,198,931 A | 8/1965 | Klempay | |
| 3,403,833 A | 10/1968 | Wheeler et al. | |
| 3,816,696 A | 6/1974 | Wheeler et al. | |
| 4,506,821 A | 3/1985 | Bernou et al. | |
| 4,626,651 A | 12/1986 | Taniguchi et al. | |
| 4,765,532 A | 8/1988 | Uomoti et al. | |
| 4,840,303 A | 6/1989 | Fujii et al. | |
| 5,125,554 A | 6/1992 | Geiermann et al. | |
| 5,172,846 A | 12/1992 | Hayashi et al. | |
| 5,266,770 A | 11/1993 | Noe | |
| 5,536,915 A | 7/1996 | Peru et al. | |

(Continued)

FOREIGN PATENT DOCUMENTS

GB 2 396 324 6/2004

(Continued)

*Primary Examiner*—Jessica L Ward
*Assistant Examiner*—Carlos Gamino
(74) *Attorney, Agent, or Firm*—Oblon, Spivak, McClelland, Maier & Neustadt, L.L.P.

(57) ABSTRACT

Plate members 17 are respectively rested on first and second tables IA and IB relatively movable toward and away from each other. The plate members 17 are caused to abut against reference positioning members 16a and 16b of reference positioning devices protruded ahead of and over opposing ends 1' of the tables IA and IB so that opposing ends of the plate members 17 are positioned in protrusion ahead of the opposing ends 1' of the tables IA and IB, and the plate members 17 are positioned laterally. Then, the positioned plate members 17 are locked on the tables IA and IB. After the reference positioning devices are retracted, the tables IA and IB are relatively moved toward each other to cause the opposing ends of the plate members 17 to abut together for formation of weld line X.

1 Claim, 14 Drawing Sheets

U.S. PATENT DOCUMENTS

| | | |
|---|---|---|
| 5,605,275 A | 2/1997 | Rintala |
| 5,614,112 A | 3/1997 | Peru et al. |
| 5,630,269 A | 5/1997 | Wasserbaech et al. |
| 5,814,786 A | 9/1998 | Johnson et al. |
| 5,932,117 A | 8/1999 | Johnson et al. |
| 5,994,665 A | 11/1999 | Nishibayashi et al. |
| 6,031,199 A | 2/2000 | Ream et al. |
| 6,070,781 A | 6/2000 | Johnson et al. |
| 6,080,961 A | 6/2000 | Suzuki |
| 6,518,535 B2 | 2/2003 | Yoneya et al. |
| 6,572,003 B2 | 6/2003 | Miyata et al. |
| 6,600,133 B2 | 7/2003 | Watanabe et al. |
| 6,612,477 B2 | 9/2003 | Takeda et al. |
| 7,377,503 B2 | 5/2008 | Yajima et al. |
| 2003/0234279 A1 | 12/2003 | Gollan et al. |
| 2006/0208040 A1 | 9/2006 | Buchheit et al. |

FOREIGN PATENT DOCUMENTS

| | | |
|---|---|---|
| JP | 60-176896 | 11/1985 |
| JP | 8-206881 | 8/1996 |
| JP | 11-226677 | 8/1999 |
| JP | 2001-287090 | 10/2001 |
| JP | 2002-137091 | 5/2002 |

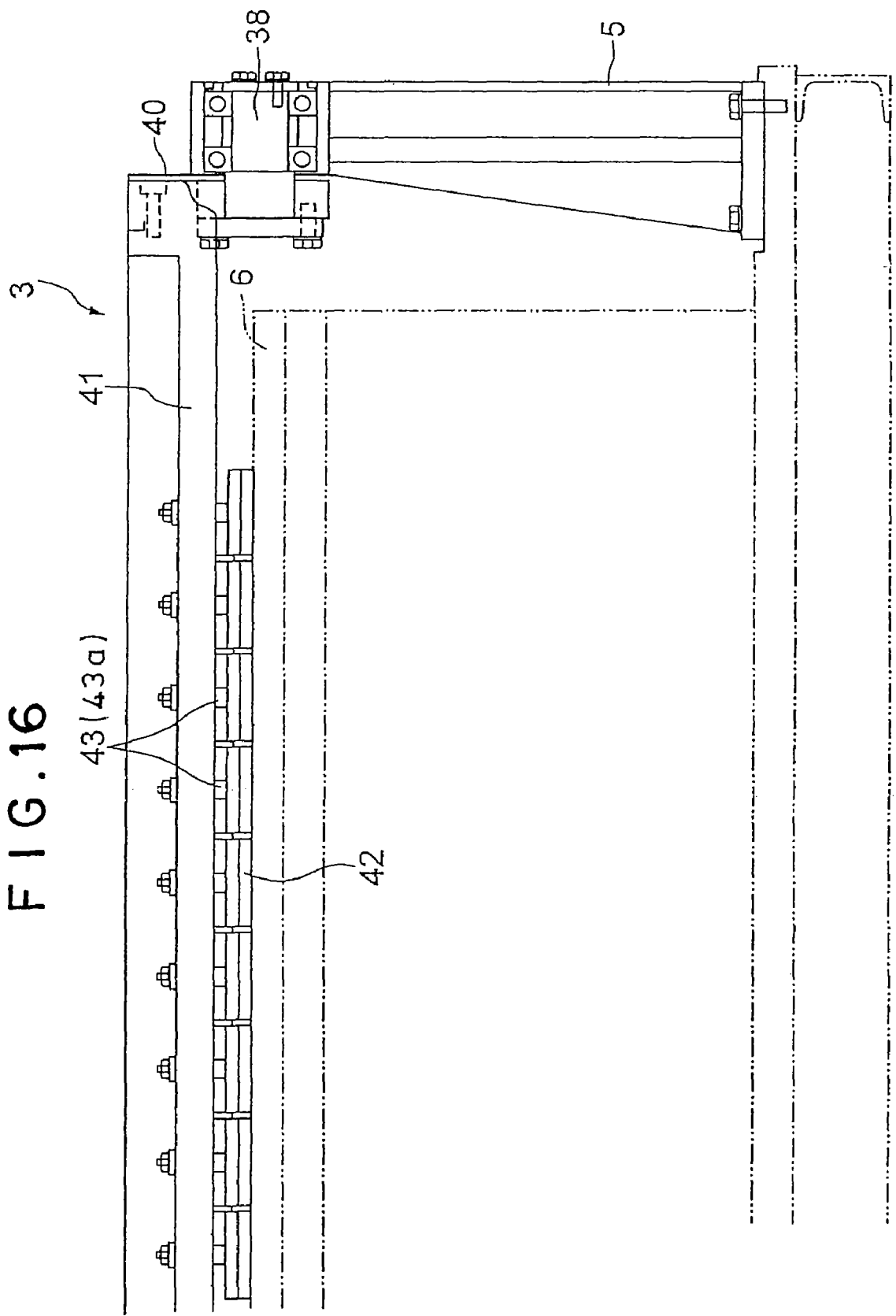

METHOD FOR POSITIONING PLATE MEMBERS TO BE BUTT-WELDED

CROSS REFERENCE TO RELATED APPLICATIONS

The present application is a divisional of U.S. patent application Ser. No. 11/916,541, filed on Jun. 27, 2008, which is incorporated in its entirety herein by reference. U.S. application Ser. No. 11/916,541 is a national stage application of PCT/JP05/10319 filed Jun. 6, 2005.

This application also claims priority under 35 USC §119 to JP application No. 2004-000185, filed Jan. 5, 2004.

TECHNICAL FIELD

The present invention relates to positioning of plate members to be butt-welded and more particularly relates to a method and an apparatus for positioning plate members to be butt-welded, which are especially useful, for example, in welding into a tailored blank or in butt-welding of thin sheets.

BACKGROUND ART

A panel component comprising steel plates with the same quality and with the same or different thicknesses is used as a blank for formation into, for example, a chassis panel of an automobile.

Conventionally, a panel component comprising, for example, steel plates with different thicknesses in combination has been produced such that plates with thick and thin thicknesses are firstly punched out, for example, by presses into required shapes and are individually formed and then are connected together, for example, through spot welding to thereby assemble the panel component. However, such process is disadvantageous in increased production cost due to much working man-hour. In order to overcome the problem, it has been also carried out that an entire panel component is made from a single thick steel plate, which may disadvantageously lead to increase in weight and in cost.

To overcome these and to produce a blank for formation of, for example, a chassis panel of an automobile, recently used is a process such that, for example, steel plates with different thicknesses are butted together and are integrated into a so-called tailored blank through $CO_2$ (carbon dioxide) laser welding, plasma welding, etc. According to this process, for example, steel plates with thick and thin thicknesses are butt-welded into a tailored blank which may be, for example, press-formed into a panel component with a predetermined shape.

Thus, the above-mentioned process using a tailored blank has effects of substantially reducing working man-hour and production cost in comparison with assembling of a panel component by, for example, spot welding and is advantageous in weight reduction in comparison with formation of an entire panel component from a single thick steel plate. Moreover, in the process of forming a panel component from a tailored blank, discards or scraps from various pressing processes may be utilized, advantageously resulting in reduction of waste of and increase in yield of material. Furthermore, the tailored blank, which has been integrated through continuous welding of steel plates, has an advantage that it has welding strength substantially increased in comparison with use of spot welding.

In order to produce a tailored blank through, as mentioned in the above, butt-welding of for example steel plates with thick and thin thicknesses, the steel plates are positioned into mutual abutment at their opposing ends for formation of weld line in place. A reference positioning mechanism used therefor is disclosed in below-mentioned Reference 1.

Such reference positioning mechanism is worked with first and second tables divided on which one and the other plate members to be butt-welded are rested, respectively, said tables being relatively movable toward and away from each other. Firstly, with the tables being separated, the one plate member on the first table is caused to abut at its end against a reference plate upwardly protruded over an upper surface of the first table, and is locked with the end being positioned. Then, the reference plate is retracted below the upper surface of the first table; and the second table is moved toward the first table to make the other plate member on the second table abut at its end against the positioned one plate member on the first table, thereby providing weld line between the plate members.

[Reference 1] JP 2001-287090A

SUMMARY OF THE INVENTION

Problems to be Solved by the Invention

According to the reference positioning mechanism as disclosed in Reference 1 above, the one plate member is positioned on the first table, and then the second table with the other plate member rested thereon is moved for abutment and positioning of the other plate member at its opposing end against an opposing end of the positioned one plate member, thereby providing weld line in position. As the two positioning operations of the plate members are needed for formation of the weld line, much time is required for the positioning, which may disadvantageously leads to prolongation of time required for welding in mass production of tailored blanks by the welding and thus lowering of production efficiency.

The invention was made in view of the above and has its object to provide a method and an apparatus for positioning plate members to be butt-welded by which plate members to be butt-welded can be positioned for formation of weld line in a small amount of time, thereby substantially enhancing efficiency of butt welding.

Means or Measures for Solving the Problems

A method for positioning plate members to be welded according to the invention is characterized in that it comprises the steps of resting plate members respectively on first and second tables relatively movable toward and away from each other, causing said plate members to abut for positioning against a reference positioning device protruded ahead of and upwardly over opposing ends of the tables and positioning said plate members laterally, locking the positioned plate members on the tables, retracting the reference positioning device, and moving the tables relatively toward each other into abutment of the opposing ends of the tables together for formation of weld line.

An apparatus for positioning plate members to be welded according to the invention is characterized in that it comprises first and second tables relatively movable toward and away from each other and each having a platform for the plate member, plate-member supports coplanar with the platform of the table, a reference positioning device provided ahead of an opposing end of said platform and adapted to be protruded upward into positioning position where an opposing end of the plate member on the plate-member supports is pushed by a pushing device for abutment against the upwardly protruded reference positioning device to thereby be positioned in protrusion ahead of an opposing end of the table, said reference positioning device being retractable from said positioning position, a lateral positioning device for laterally positioning the plate member having been longitudinally positioned and a press-locking device for locking the positioned plate member on the platform, the tables with the plate members locked thereon being relatively moved toward each other with said reference positioning devices being retracted, whereby the opposing ends of the plate members are caused to abut against each other for formation of weld line.

The apparatus for positioning the plate members to be welded is characterized in that said reference positioning device comprises at least a pair of laterally spaced reference positioning members.

The apparatus for positioning the plate members to be welded is characterized in that said pushing device comprises a horizontally rotatable pushing roll supported by a resilient member.

The apparatus for positioning the plate members to be welded is characterized in that said lateral positioning apparatus comprises a pair of pushing members laterally and relatively movable toward and away from each other, one of said pushing members being a laterally positioning pusher, the other of said pushing members being a resilient pusher supported by a resilient member.

The apparatus for positioning the plate members to be welded is characterized in that said press-locking device is gantry-shaped and is constructed such that an opposing-end-side upper surface of the plate member positioned on the table is releasably pushed by pressing members against the platform.

The apparatus for positioning the plate members to be welded is characterized in that said press-locking device comprises a gantry frame, said frame having pressing members arranged longitudinally of and on a lower portion of said frame via resilient members.

The above means is operated as follows.

A plate member is rested on each of first and second tables relatively movable toward and away from each other; an opposing end of the plate member is positioned in protrusion ahead of an opposing end of the table by a reference positioning device provided ahead of the opposing end of the table and is locked; then, after the reference positioning device is retracted away from the positioning position, the tables are relatively moved toward each other to cause the opposing ends of the plate member to abut together for formation of weld line. Thus, weld line can be formed in a short period of time.

Effects of the Invention

In a method and an apparatus for positioning plate members to be butt-welded according to the invention, a plate member is rested on each of first and second tables relatively movable toward and away from each other; a reference positioning device provided ahead of an opposing end of each of the tables is protruded so that the opposing end of the plate member is positioned in protrusion ahead of the opposing end of the table and is locked; and then, after the reference positioning device is retracted away from the positioning position, the tables are relatively moved toward each other to cause the opposing ends of the plate members to abut together to thereby form weld line. Thus, in comparison with the conventional way of carrying out twice the plate-member positioning operation, the invention which can conduct butt-welding after finishing the positioning of the plate members in a single operation has advantages or effects that working hours can be substantially reduced and thus working efficiency of butt-welding can be substantially enhanced.

BRIEF DESCRIPTION OF THE DRAWINGS

FIG. 16 is a front view of the press-locking device looking from left in FIG. 15.

Figure 1:
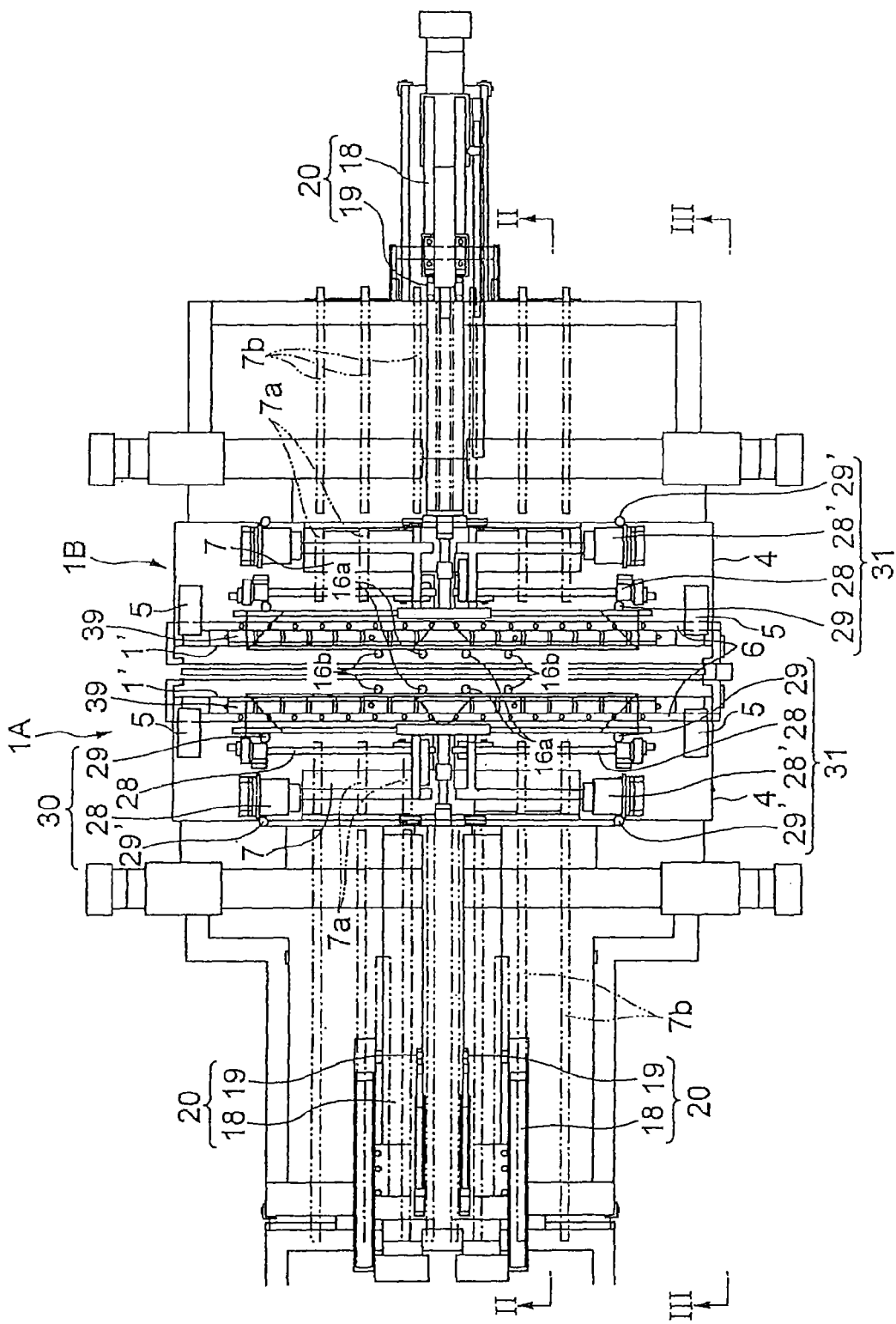
FIG. 1 is an entire plan view of an embodiment of an apparatus for positioning plate members to be butt-welded according to the invention.

| | Explanation of the Reference Numerals |
|---|---|
| 1' | opposing end |
| 1A | first table (table) |
| 1B | second table (table) |
| 4 | slider |
| 6 | platform |
| 7a | plate-member support |
| 7b | plate-member support |
| 12 | reference positioning device |
| 16a | reference positioning member |
| 16b | reference positioning member |
| 17 | plate member |
| 20 | pushing device |
| 22 | pushing roll |
| 26 | resilient member |
| 30 | left pushing member (lateral positioning device) |
| 31 | right pushing member (lateral positioning device) |
| 33 | resilient pusher |
| 33' | lateral positioning pusher |
| 35 | resilient member |
| 37 | locking piece |
| 39 | press-locking device |
| 41 | frame |
| 42 | pressing member |
| 43 | resilient member |
| X | weld line |

BEST MODE FOR CARRYING OUT THE INVENTION

An embodiment of the invention will be disclosed in conjunction with attached drawings.

Figure 2:
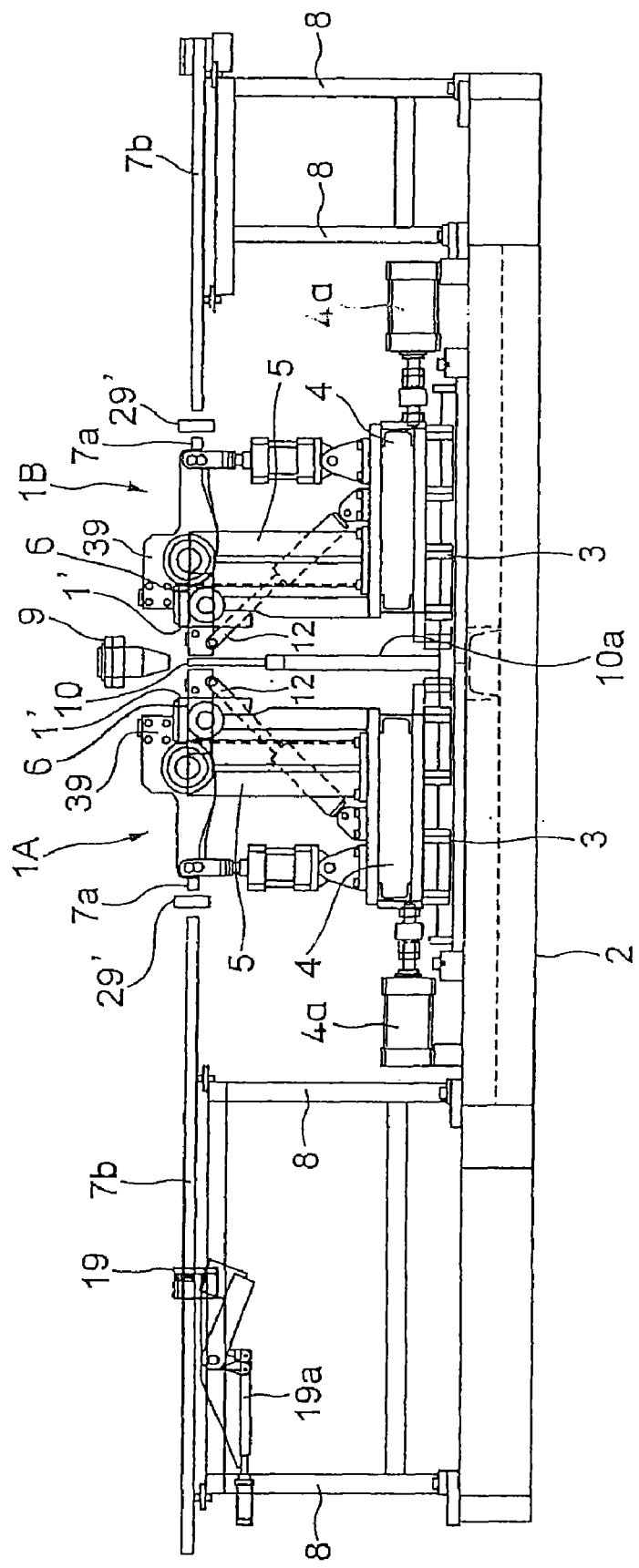
FIG. 2 is a side view looking in the direction of arrows II in FIG. 1.
Figure 3:
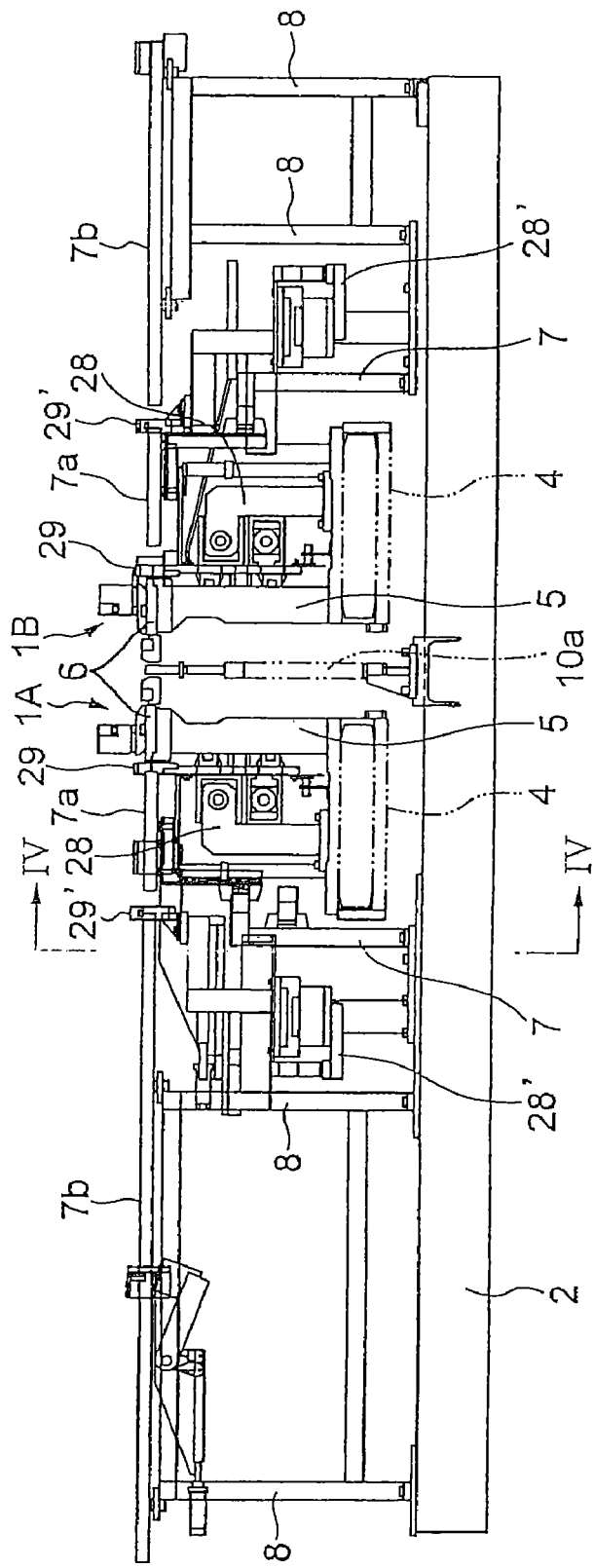
FIG. 3 is a side view looking in the direction of arrows III in FIG. 1.
Figure 4:
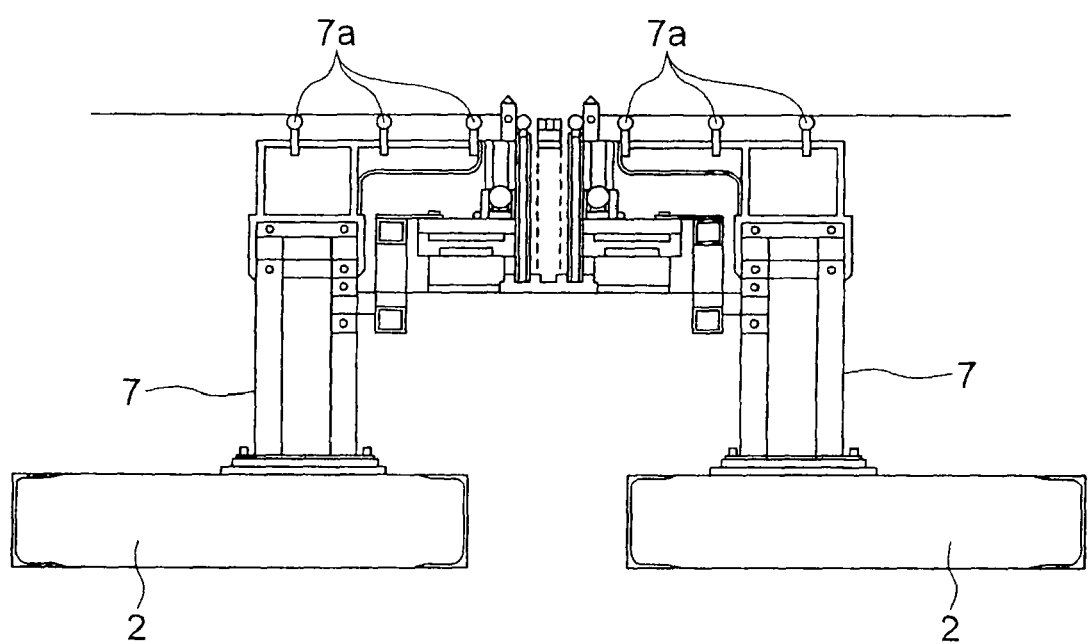
FIG. 4 is a front view looking in the direction of arrows IV in FIG. 3.

FIG. 1 is an entire plan view of an embodiment of an apparatus for positioning plate members to be butt-welded according to the invention; FIG. 2 is a side view looking in the direction of arrows II in FIG. 1;

FIG. 3 is a side view looking in the direction of arrows III in FIG. 1; and FIG. 4 is a front view looking in the direction of arrows IV in FIG. 3. As shown in FIG. 2, arranged oppositely to each other are a rear- and front-side first and second table 1A and 1B relatively movable toward and away from each other longitudinally (axially of the apparatus) through liner motion (LM) guides 3. Each of the tables 1A and 1B has a laterally elongated slider 4 adapted to be longitudinally movable along the LM guide 3 by a drive 4a such as air cylinder. Each of the sliders 4 has vertical pillars 5 arranged on lateral sides, respectively. The left and right pillars 5 have a platform 6 locked to and extending between upper ends of the pillars 5 to receive a laterally extending plate member 17 (see FIG. 7).

Locked on the mounting 2 and longitudinally outwardly of the tables 1A and 1B are support members 7 as shown in FIGS. 3 and 4. The support member 7 has, on its top, a plurality of short plate-member supports 7a such as pipes which extend horizontally and longitudinally and are laterally spaced apart from each other to be protruded above the slider 4. The plate-member supports 7a are arranged to be coplanar at their upper surfaces with upper surface of the platform 6. In the above embodiment, the description has been made on the tables 1A and 1B longitudinally movable for relative movement toward and away from each other; alternatively, one and the other of the tables 1A and 1B may be made immovable and movable, respectively, for their relative movement toward and away from each other.

Also locked on the mounting 2 with respect to each of the tables 1A and 1B are support members 8 provided at their tops with long plate-member supports 7b which are aligned with and spaced apart from the short plate-member supports 7a. Though the above embodiment has been illustrated on the plate-member supports 7a and 7b locked with respect to the mounting 2, alternatively the supports 7a and 7b may be arranged on the tables 1A and 1B for their longitudinal movement together with the tables 1A and 1B.

Arranged centrally and at an upper position between the opposing ends of the tables 1A and 1B is, as shown in FIG. 2, a welder 9 adapted to be laterally moved to carry out flat-position welding. Arranged centrally and at a lower position between the opposing ends of the tables 1A and 1B is a sealing member 10 supported, for example, by a pillar 10a to seal a lower region for retaining of an atmosphere due to inert gas blown from upward upon welding by the welder 9.

Figure 5:
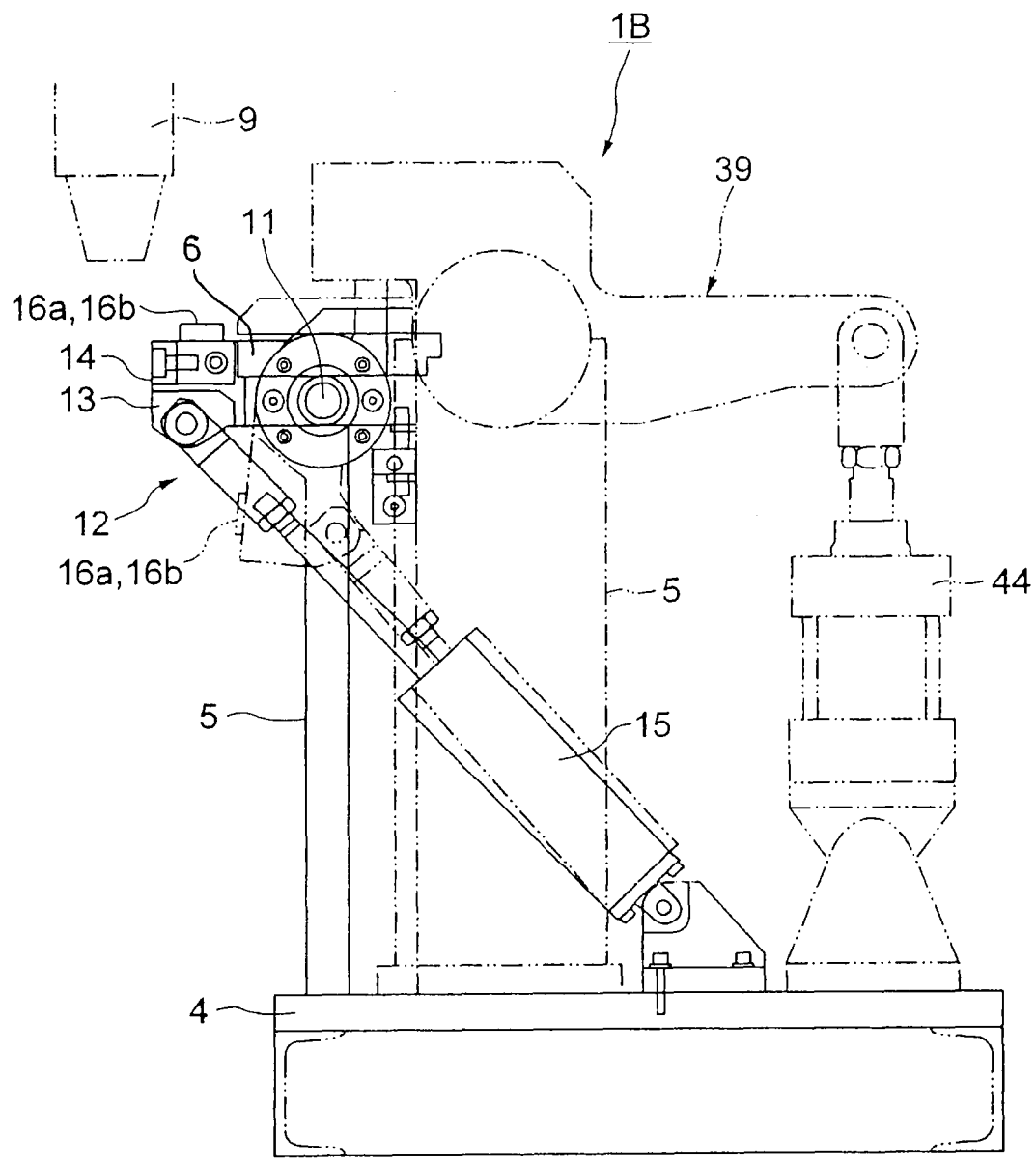
FIG. 5 is a side view showing an embodiment of a reference positioning device.
Figure 6:
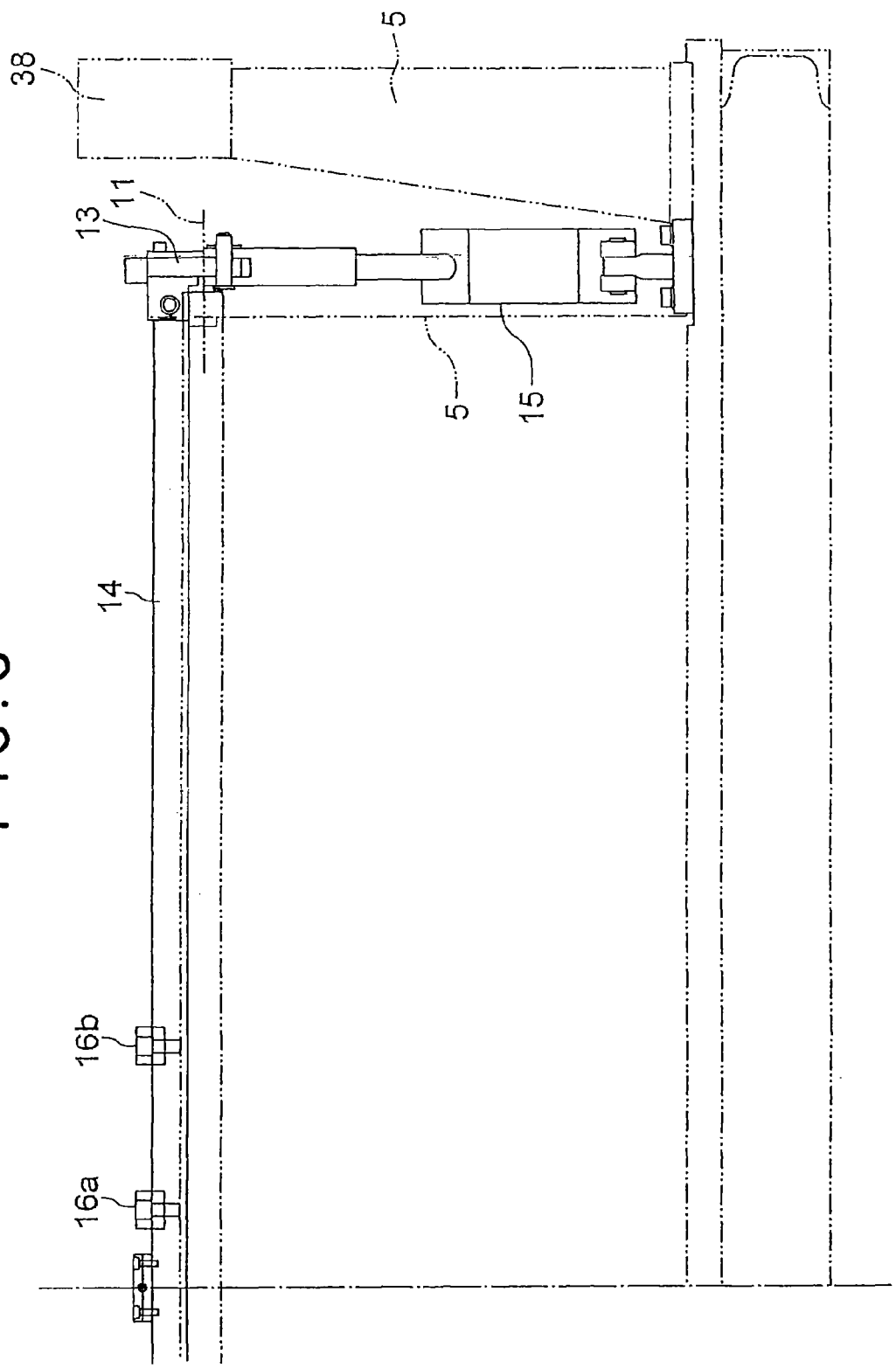
FIG. 6 is a front view looking from left in FIG. 5.

Arranged between upper ends of the pillars 5 on the lateral sides of the front and rear sliders 4 is, as shown in FIGS. 5 and 6, reference positioning devices 12 each adapted to be rotated about a pivot shaft 11. FIG. 5 shows only the reference positioning device 12 on the second table 1B, the similar reference positioning device 12 being also provided on the first table 1A. The reference positioning device 12 comprises short arms 13 each pivoted at its one end to the pivot shaft 11 on the pillar 5 and a laterally elongated positioning frame 14 arranged between and locked to the other ends of the arms 13. Arranged and connected between the other end of the arm 13 and the slider 4 is an actuator 15 such as air cylinder adapted to selectively swing the arm 13 into a horizontally protruded state ahead of the table 1A or 1B and into a vertically downwardly retracted state. Arranged on the positioning frame 14 are at least a pair (two pairs in the figure) of upwardly protruded, laterally inward and outward reference positioning members 16a and 16b (see FIG. 1). The reference positioning member 16a and 16b are associated with the narrow and wide plate members 17, respectively, and may be in the from of, for example, positioning pins or blocks. The reference positioning device 12 may be driven by the actuator 15 to selectively swing the reference positioning members 16a and 16b into protruded positions shown in solid line in FIG. 7 ahead of the opposing ends 1' of the platforms 6 of the tables 1A and 1B, and into vertically downwardly retracted positions shown in dotted line where the front and rear reference positioning members 16a and 16b are adapted not to interfere with each other even if the tables 1A and 1B are relatively moved to each other.

Figure 8:
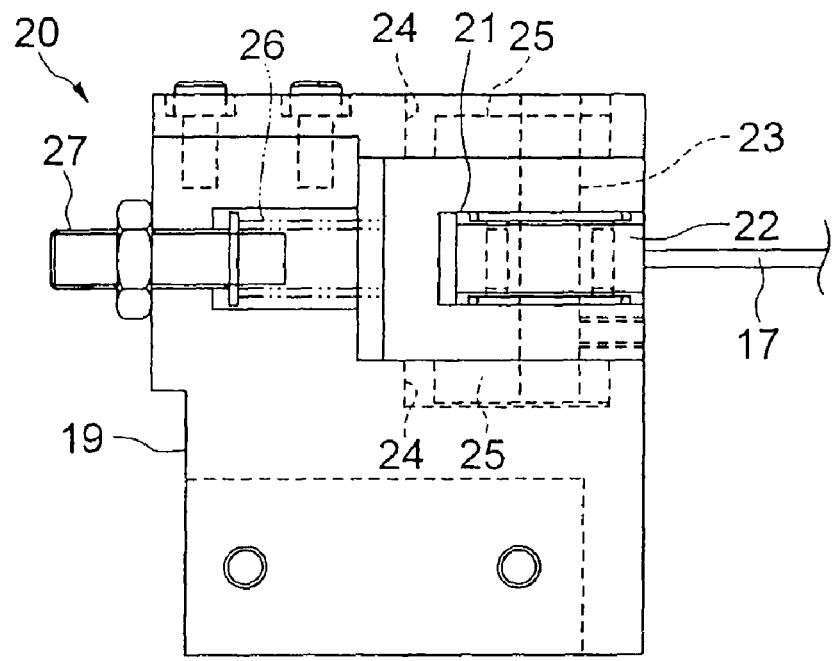
FIG. 8 is a side view showing the structure of a movement block of a pushing device on the first table.
Figure 9:
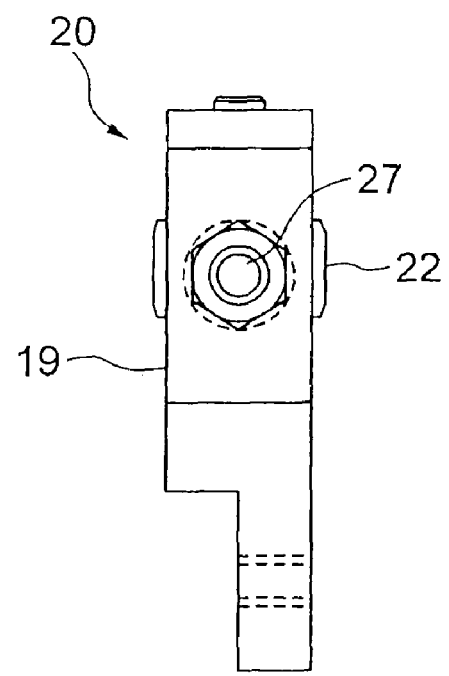
FIG. 9 is a front view showing the movement block looking from left in FIG. 8.
Figure 10:
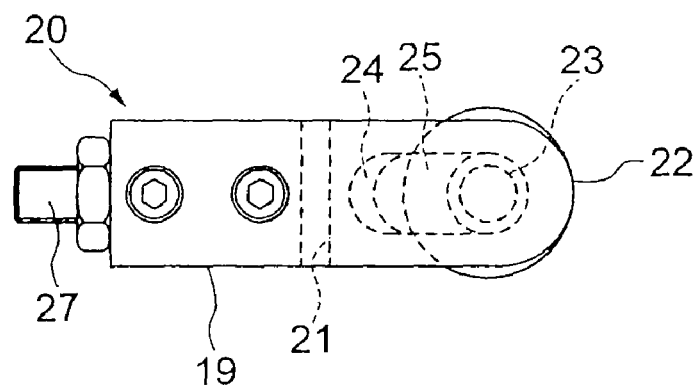
FIG. 10 is a plan view of the movement block shown in FIG. 8.

Arranged among the plate-member supports 7b shown in FIGS. 1 and 2 are pushing devices 20 each adapted to longitudinally move a movement block 19 through a linear movement (LM) guide actuator 18 to thereby push the plate members 17 on the supports 7a or 7b against the reference positioning members 16a and 16b in FIG. 5 so as to longitudinally position the plate members 17. There are two pushing devices 20 from side to side in FIG. 1 each having the movement block 19 adapted to be protruded and retracted over and below the upper surfaces of the plate members 7b as shown in FIG. 2 by an air cylinder 19a. FIGS. 8, 9 and 10 show the structure of the movement block 19 of the pushing device 20 on the first table 1A; though only the pushing device 20 on the first table 1A is shown, the similar movement block 19 is also arranged on the pushing device 20 on the second table 1B. In FIGS. 8 and 10, the movement block 19 has at its right a U-shape-sided support member 21 which has, within its U-shape portion, a pushing roll 22 horizontally rotatable about a vertical shaft 23 which in turn is attached to a moving piece 25 fitted in a slot 24 on the movement block 19 so as to be movable longitudinally. In FIGS. 8 and 10, the movement block 19 has at its left side a resilient member 26 such as spring for urging the support member 21 to the right, and has at its left end an adjusting bolt 27 for adjusting the resilience force of the resilient member 26.

Arranged on each of the first and second tables 1A and 1B in FIGS. 1 and 3 is a lateral positioning device comprising left and right pushing members 30 and 31 which relatively and laterally move movement blocks 29 through LM guide actuators 28 to laterally position the plate members 17 on the plate-member supports 7a and 7b. The movement block 29 is adapted to laterally move ahead of the opposing ends of the short plate-member supports 7a. In FIGS. 1 and 3, the left and right pushing members 30 and 31 are shown to respectively have auxiliary movement blocks 29' arranged on LM guide actuators 28' on the mounting 2 and adapted to be moved between the opposing ends of the short and long plate-member supports 7a and 7. Thus, the plate member 17 is pushed at two points or by the movement block 29 and by the auxiliary movement block 29'.

Figure 11:
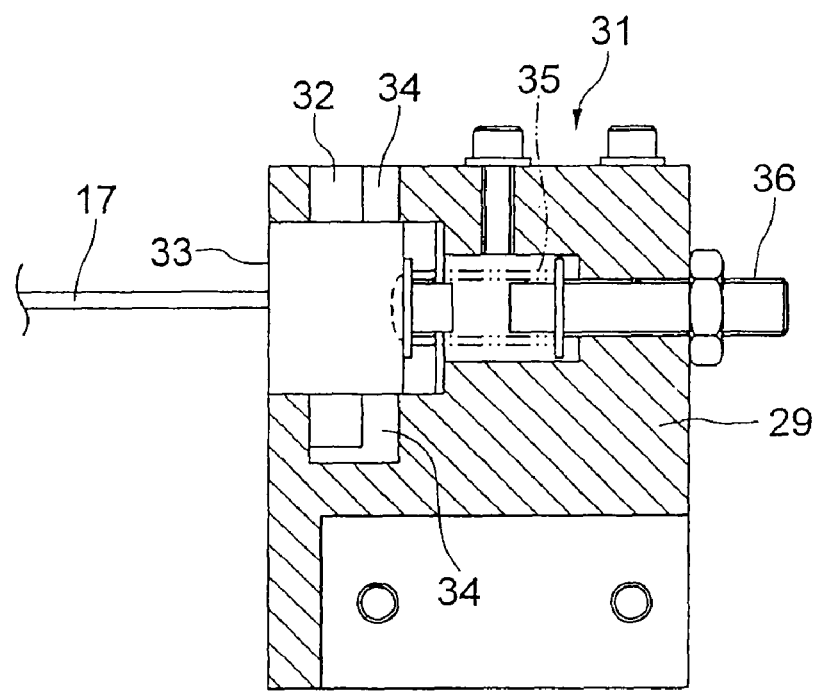
FIG. 11 is a front view showing the structure of a right pushing member.
Figure 12:
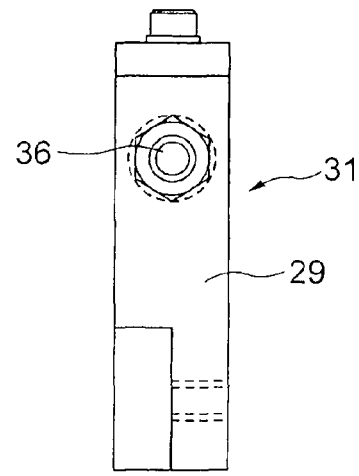
FIG. 12 is a side view of the right pushing member looking from right in FIG. 11.
Figure 13:
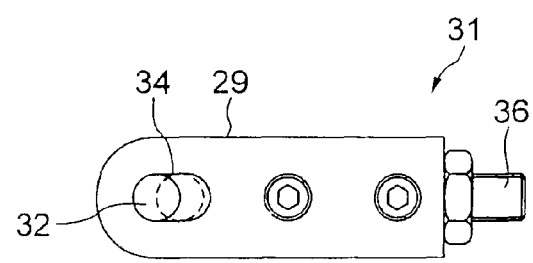
FIG. 13 is a plan view of the right pushing member shown in FIG. 11.

FIGS. 11, 12 and 13 show the structure of the right pushing member 31 which has at its left a cylindrical pusher 33 supported by a vertical shaft 32 which in turn is fitted into a slot 34 on the movement block 29 so as to move longitudinally. In FIGS. 11 and 13, the movement block 29 has at its right side a resilient member 35 such as spring for pushing the pusher 33 to the left, and has at its right end an adjusting bolt 36 for adjusting resilience force of the resilient member 35. Thus, the pusher 33 of the right pushing member 31 serves as a resilient pusher with resilient force due to the resilient member 35.

Figure 14:
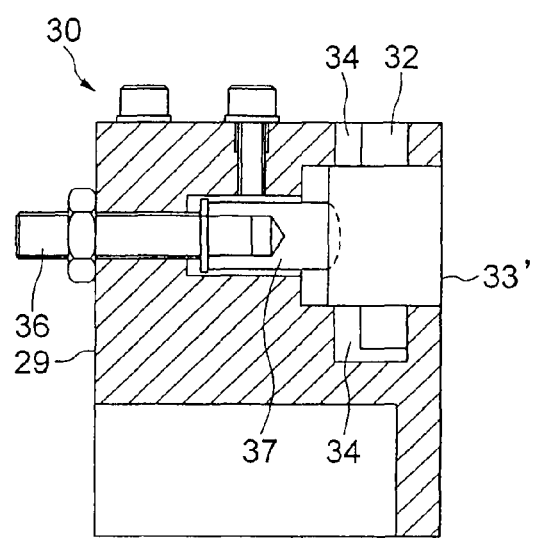
FIG. 14 is a front view showing the structure of a left pushing member.

As shown in FIG. 14, the left pushing member 30 comprises the movement block 29 which is structurally similar to that shown in FIG. 11 and which has, not the resilient member 35 for pushing the pusher 33, but a locking piece 37 at a left side of a pusher 33' so as to push the pusher 33' to the right for lateral immobilization of the pusher 33'. This makes the pusher 33' of the left pushing member 30 to serve as a laterally positioning pusher.

Control is such that the left pushing member 30 is driven forward by the LM guide actuator 28 into a predetermined position and stopped, the right pushing member 31 being driven forward into a predetermined position with time lag to the left pushing member 30. Thus, the left and right pushing members 30 and 31 are relatively moved toward each other so that the resilient pusher 33 supported by the resilient member 35 pushes the plate member 17 against the laterally positioning pusher 33' locked in position by the locking piece 37, whereby the plate member 17 is laterally positioned. In the above embodiment, the description has been made on the left and right pushing members 30 and 31 both laterally moved toward and away from each other so as to reduce time required for the positioning; alternatively, the one of the left and right pushing members 30 and 31 may be made immovable for movement of the other toward and away therefrom.

Figure 15:
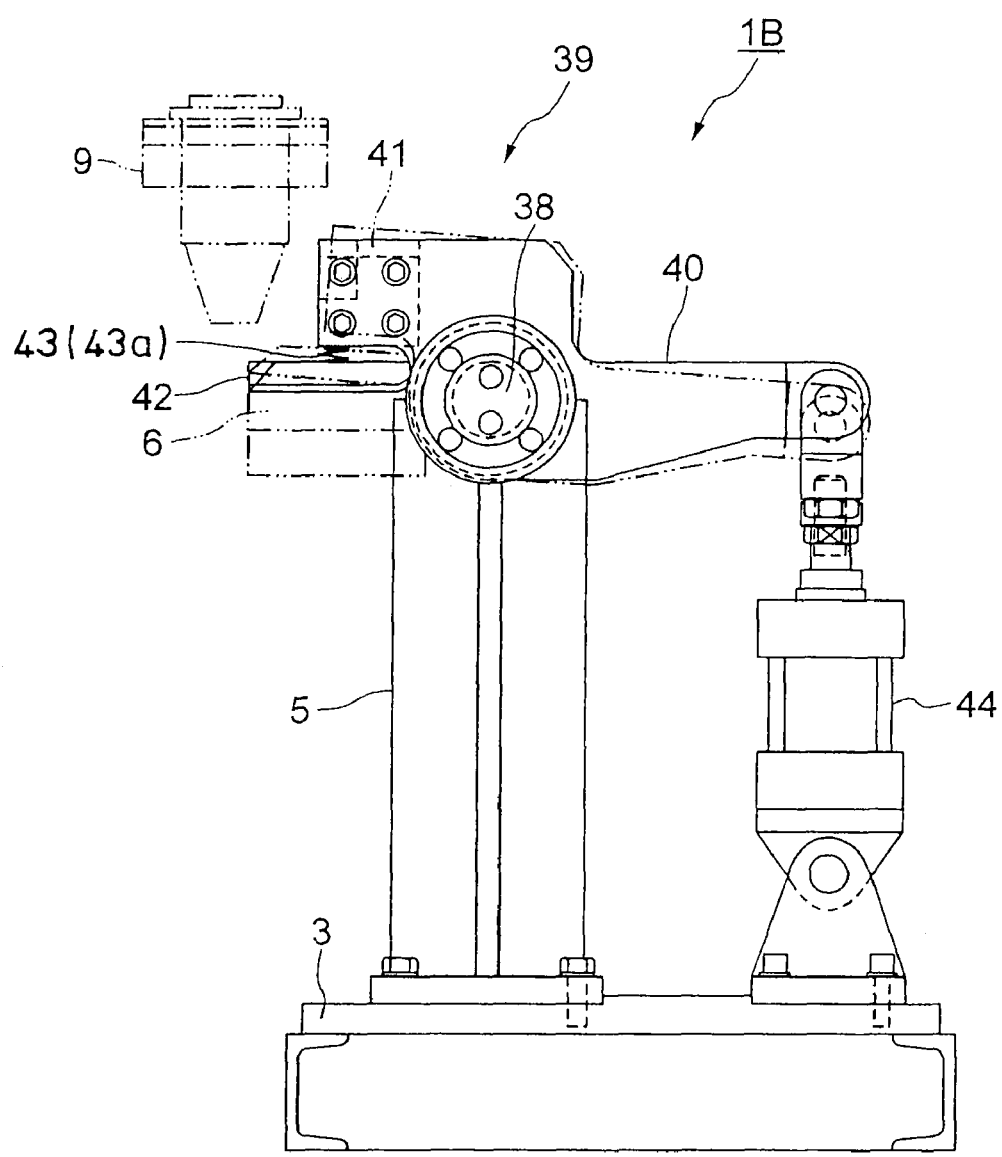
FIG. 15 is a side view showing the structure of a press-locking device.

Arranged on and extend between the upper ends of the pillars 5 on lateral sides of each of the front and rear sliders 4 is a press-locking device 39 for movement about a pivot shaft 38 as shown in FIGS. 15 and 16. Though FIG. 15 shows only the press-locking device 39 for the second table 1B, the similar press-locking device 39 is provided also for the first table 1A. The press-locking device 39 has left and right pivot arms 40 pivoted at their intermediate portions about the pivot shaft 38 on the pillars 5. Attached to one ends of the pivot arms 40 is a frame 41 laterally extending over the platform 6 to provide a gantry which strides across the tables 1A and 1B. Mounted on a lower surface of the frame 41 through resilient members 43 such as disc springs 43a are a plurality of pressing members 42 extending laterally and in parallel with the frame 41. Arranged between the other ends of the pivot arms 40 and the slider 4 are actuators 44 such as air cylinders driven to rotate the pivot arms 40 for lifting up and down the pressing members 42 so that the opposing-end-side upper surface of the plate member 17, which is pushed against the members 16a and 16b of the reference positioning device 12 to be positioned on the table 1A or 1B, can be pressed by the pressing members 42 to be locked on the platform 6 or can be released by moving the pressing members 42 away from the plate member 17. In this connection, since the plural pressing members 42 are mounted on the lower surface of the frame 41 through the resilient members 43 such as disc springs 43a, the plate member 17 can be locked on the platform 6 under a predetermined pressing force by the pressing members 42 even if the plate member 17 may vary in thickness or may have bent.

Next, mode of operation of the above embodiment will be described with respect to FIG. 17 and in conjunction with FIGS. 1-16.

Figure 17A:
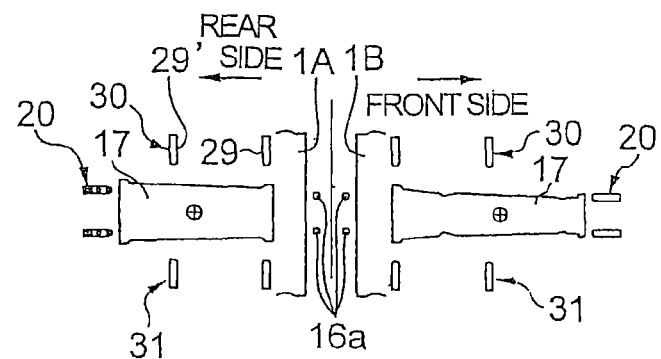
FIGS. 17(A), (B), (C), (D), (E) and (F) are schematic step view showing stepwise the operation of a positioning method according to the invention.

FIG. 17(A) shows a state that the tables 1A and 1B are away from each other and the plate members 17 are transferred onto the plate-member supports 7a and 7b shown in FIGS. 1 and 2. In FIG. 17(A), the pushing devices 20 are being retracted away from the reference positioning devices 12, the left and right pushing members 30 and 31 of the lateral positioning devices being also retracted into positions relatively away from each other. In this state, each of the plate members 17 is transferred onto the plate-member supports 7a and 7b and between the reference positioning device 12, the pushing device 20 and the left and right pushing members 30 and 31.

In this case, the reference positioning device 12 is being rotated upward by the operation of the actuator 15 in FIG. 5 into a position shown in solid lines so that reference positioning members 16a and 16b are kept protruded over the upper surface of the platform 6 on each of the tables 1A and 1B. The pressing members 42 of the press-locking device 39 is kept upwardly away from the upper surface of the platform 6 on each of the tables 1A and 1B as shown in two-dotted chain lines in FIG. 15.

Figure 17B:
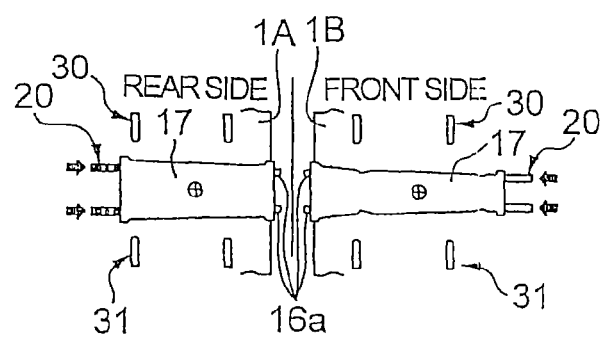

In this state, as shown in FIG. 17(B), the LM guide actuator 18 in FIG. 1 is driven to move the movement block 19 of the pushing device 20 and thus the plate member 17 toward the opposing end 1' of each of the tables 1A and 1B. Then, the opposing end of the plate member 17 passes underneath the pressing members 42 and is pushed against the reference positioning members 16a so that the plate member 17 is positioned longitudinally, the plate member 17 being stably pushed by a predetermined pushing force since it is pushed by the pushing roll 22 supported by the resilient members 26 in the pushing device 20 as shown in FIG. 8.

Figure 17C:
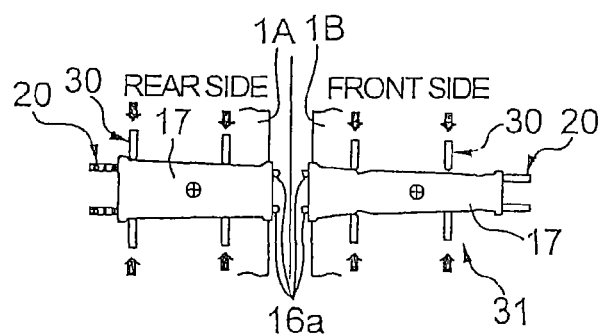

Then, as shown in FIG. 17(C), control is made such that the movement blocks 29 and 29' of the left pushing member 30 are moved forward by the LM guide actuators 28 and 28' shown in FIG. 1 into a predetermined position and are stopped, and the movement blocks 29 and 29' of the right pushing member 31 are moved forward with time lag to the left pushing member 30. The left and right pushing members 30 and 31 are relatively moved toward each other in this manner so that the plate member 17 is laterally positioned. The positions into which the left and right pushing members 30 and 31 are moved forward are set in accordance with variation of lateral or widthwise size of the plate member 17 to be treated with.

When the plate member 17 having been pushed and locked to the reference positioning members 16a by the pushing device 20 is to be pushed laterally by the left and right pushing members 30 and 31 as mentioned above, the pushed points may not be smoothly displaced, resulting in horizontal pivotal force generated on the plate member 17 and resultant deviance in positioning. However, as mentioned above, the plate member 17 is pushed by the pushing roll 22 of the pushing device 20 and the resilient pusher 33 of the right pushing member 31 respectively supported by the resilient members 26 and 35, so that the pushing roll 22 and the resilient pusher 33 are displaced along the plate members 17, which eliminates the problem of pivotal force generated on the plate member 17.

Figure 17D:
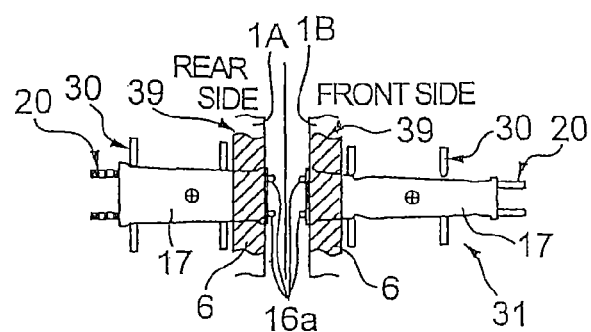

Then, as shown in FIG. 17(D), the actuators 44 shown in FIG. 15 are driven to lower the pressing members 42 of the press-locking device 39 for locking of the positioned plate members 17 on the platform 6 of each of the tables 1A and 1B. Thus, the work of positioning and locking of the one and the other plate members 17 can be completed in a single operation.

Figure 17E:
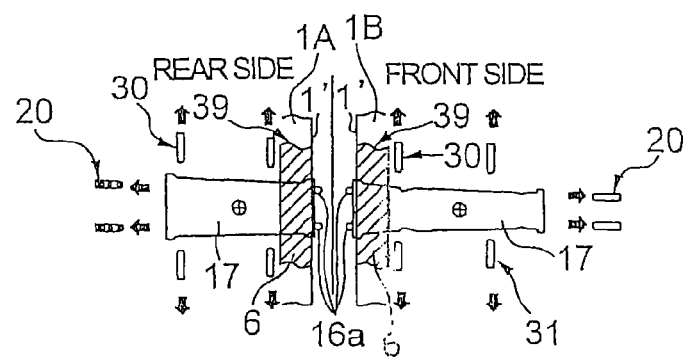

Then, as shown in FIG. 17(E), all of the pushing devices 20 and the left and right pushing members 30 and 31 are retracted, which causes the plate members 17 to be held in position only by the press-locking devices 39. Then, the actuators 15 shown in FIG. 5 are driven to retract the reference positioning members 16a and 16b of the reference positioning device 12 vertically downwardly as shown in two-dot-chain lines, which allows the opposing ends of the plate members 17 to be protruded ahead of the opposing ends 1' of the tables 1A and 1B by a required distance.

Figure 17F:
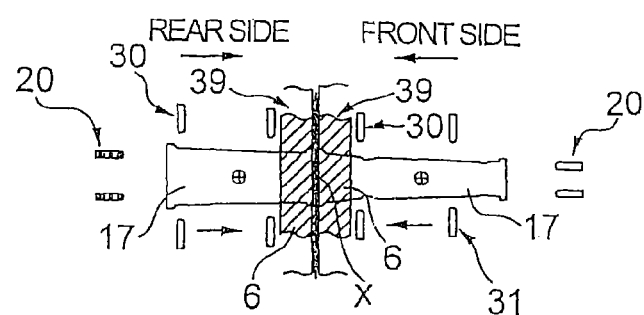

Then, as shown in FIG. 17(F), the drive units 4*a* shown in FIG. 2 are driven to move the tables 1A and 1B along the LM guides 3 relatively toward each other so that the opposing ends of the plate members 17 are caused to abut against each other to form weld line X; no interference problem is caused by relative movement of the tables 1A and 1B toward each other since the reference positioning members 16*a* and 16*b* of the reference positioning device 12 are being retracted downward.

Figure 7:
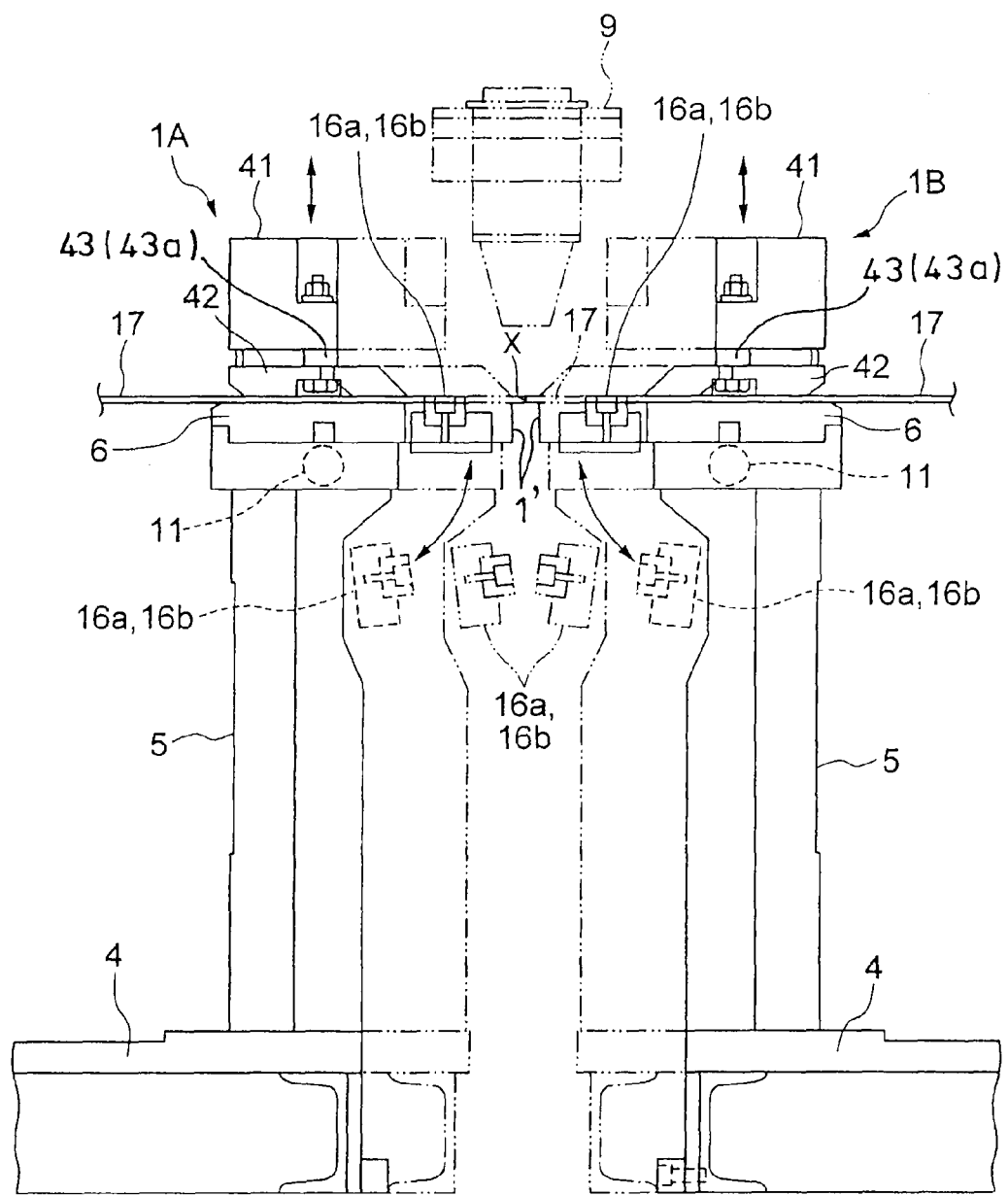
FIG. 7 is a side view for showing operation of the reference positioning members and the pressing members for the first and second tables.

In this manner, weld line X is formed just below the welder 9 as shown in FIG. 7 and is butt-welded by for example $CO_2$ (carbon dioxide) laser welding or plasma welding to thereby integrate the plate members 17.

It is to be understood that the invention is not limited to the above embodiment and that various changes and modifications may be made without departing from the scope of the invention.

The invention claimed is:

1. A method for positioning opposing plate members with front ends to be butt-welded, comprising:
   providing an apparatus comprising:
   a first table for a first plate member to be butt welded and a second table for a second plate member to be butt welded, wherein the first and second tables are opposing and relatively movable toward and away from each other and have respective first and second platforms for the first and second plate members,
   a first plate member support coplanar with the first platform of the first table,
   a second plate member support coplanar with the second platform of the second table,
   wherein each platform has a platform front end, the platform front ends being closest to the front ends of the plate members to be butt welded,
   a first reference positioning device protrusibly upward and ahead of the platform front end of the first platform of the first table in a longitudinal direction of movement which is identical to a direction that a first pushing device longitudinally pushes the first plate member in order to longitudinally position the first plate member on the first plate-member support,
   a second reference positioning device protrusibly upward and ahead of the platform front end of the second platform of the second table in a longitudinal direction of movement which is identical to a direction that a second pushing device longitudinally pushes the second plate member in order to longitudinally position the second plate member on the second plate member support,
   wherein the first and second plate members are longitudinally positioned by abutting the front ends of the plate members against their respective reference positioning devices by being longitudinally pushed by their respective pushing devices,
   lateral positioning devices for laterally positioning the plate members having been longitudinally positioned by the first and second reference positioning devices,
   press-locking devices for locking the positioned plate members on the platforms, each of said press-locking devices having a plurality of pressing members aligned longitudinally of a vertically movable frame laterally extending over the platform via resilient members so as to be adjustably pushed,
   each of the first and second reference positioning devices having a plurality of positioning members aligned on a positioning frame laterally extending over the platform, said positioning frame being driven by an actuator to selectively swing the positioning members into an upwardly protruded position longitudinally ahead of the front ends of their respective platforms, and into a downwardly retracted position longitudinally behind the front ends of the respective platforms,
   using the apparatus to perform the following steps:
   a step of, with the plate members being rested on the platforms of the tables, and with the positioning members of the reference positioning devices being in upwardly protruded position longitudinally ahead of the front ends of their respective platforms, pushing the plate members by the pushing devices to cause the front ends of the plate members to abut against the positioning members to thereby longitudinally position the plate members,
   a step of laterally positioning the longitudinally positioned plate members by the lateral positioning devices,
   a step of locking the positioned plate members on each of the platforms by the press-locking devices,
   a step of swinging the positioning frames of the reference positioning devices into downwardly retracted positions longitudinally behind the front ends of their respective platforms, and
   a step of moving the tables relatively toward each other to cause the front ends of the plate members to abut against each other to form a welding joint.

* * * * *